US011235739B2

(12) United States Patent
Suzuki et al.

(10) Patent No.: US 11,235,739 B2
(45) Date of Patent: Feb. 1, 2022

(54) CONTROL DEVICE, CONTROL METHOD, AND NON-TRANSITORY COMPUTER-READABLE STORAGE MEDIUM

(71) Applicant: HONDA MOTOR CO., LTD., Tokyo (JP)

(72) Inventors: Noriaki Suzuki, Wako (JP); Yosuke Mizutani, Wako (JP); Kohei Maruyama, Wako (JP); Shinya Kobayashi, Wako (JP); Shunpei Matsumura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 242 days.

(21) Appl. No.: 16/577,214

(22) Filed: Sep. 20, 2019

(65) Prior Publication Data

US 2020/0101948 A1 Apr. 2, 2020

(30) Foreign Application Priority Data

Sep. 28, 2018 (JP) .............................. JP2018-184942

(51) Int. Cl.
*B60T 7/04* (2006.01)
*B60W 50/14* (2020.01)
(Continued)

(52) U.S. Cl.
CPC .............. *B60T 7/045* (2013.01); *B60R 22/48* (2013.01); *B60T 7/12* (2013.01); *B60W 50/14* (2013.01);
(Continued)

(58) Field of Classification Search
CPC . B60T 7/045; B60T 7/12; B60R 22/48; B60R 2022/4866; B60W 50/14; B60W 2050/143; B60W 2050/146
See application file for complete search history.

(56) References Cited

U.S. PATENT DOCUMENTS 6,302,823 B1 * 10/2001 Eckert ................ B60K 31/0008
477/186
6,655,749 B2 * 12/2003 Bond, III ............ B60W 50/087
303/9
(Continued)

FOREIGN PATENT DOCUMENTS

JP 2016-111759 A 6/2016
JP 2019118222 A * 7/2019

OTHER PUBLICATIONS

Hashimoto Yohei; JP2019118222A Electric-Vehicular Display System—English Translation; Jul. 8, 2019; Espacenet (Year: 2019).*

*Primary Examiner* — Yazan A Soofi
*Assistant Examiner* — Naeem Taslim Alam
(74) *Attorney, Agent, or Firm* — Thomas Horstemeyer, LLP

(57) ABSTRACT

A control device configured to control a vehicle is provided. The device comprises a traveling control unit capable of executing a one-pedal function of controlling both a driving force and a braking force of the vehicle in accordance with an operation amount of an accelerator pedal, and an output control unit of notifying a driver of an instruction to depress a brake pedal in a case in which a seatbelt is detached during execution of the one-pedal function and during traveling of the vehicle, and the vehicle stops in that state.

7 Claims, 7 Drawing Sheets

(51) Int. Cl.
   *B60T 7/12*      (2006.01)
   *B60R 22/48*     (2006.01)
(52) U.S. Cl.
   CPC ............... *B60R 2022/4866* (2013.01); *B60W 2050/143* (2013.01); *B60W 2050/146* (2013.01)

(56) References Cited

U.S. PATENT DOCUMENTS

| | | | | |
|---|---|---|---|---|
| 2003/0079321 | A1* | 5/2003 | Dean, III | A44B 11/2576 |
| | | | | 24/633 |
| 2004/0113486 | A1* | 6/2004 | Koga | B60T 13/66 |
| | | | | 303/20 |
| 2007/0206833 | A1* | 9/2007 | Otsuka | G06K 9/00805 |
| | | | | 382/103 |
| 2008/0133073 | A1* | 6/2008 | Griffith | B60T 13/02 |
| | | | | 701/9 |
| 2009/0188760 | A1* | 7/2009 | Boisseau | F16D 65/18 |
| | | | | 188/72.2 |
| 2014/0374199 | A1* | 12/2014 | Minoshima | B60T 7/12 |
| | | | | 188/163 |
| 2015/0321668 | A1* | 11/2015 | Elwart | B60W 30/10 |
| | | | | 701/41 |
| 2016/0052494 | A1* | 2/2016 | Yamamoto | B60T 8/4872 |
| | | | | 701/70 |
| 2016/0075331 | A1* | 3/2016 | Tomozawa | B60W 10/18 |
| | | | | 701/41 |
| 2016/0339888 | A1* | 11/2016 | Yokoyama | F16D 65/18 |
| 2017/0028984 | A1* | 2/2017 | Kiyokawa | G01S 15/931 |
| 2018/0090011 | A1* | 3/2018 | Morel | G08G 1/167 |

\* cited by examiner

CONTROL DEVICE, CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2018-184942 filed on Sep. 28, 2018, the entire disclosure of which is incorporated herein by reference.

BACKGROUND OF THE INVENTION

Field of the Invention

The present invention relates to a control device, a control method, and a non-transitory computer-readable storage medium.

Description of the Related Art

Japanese Patent Laid-Open No. 2016-111759 proposes a one-pedal function of controlling both the driving force and the braking force of a vehicle in accordance with the operation amount of an accelerator pedal of the vehicle. In this vehicle, after the vehicle is stopped, the stop state of the vehicle is held by the braking force of the one-pedal function. After a predetermined time has elapsed from the stop, the vehicle starts actuating an electric parking brake.

SUMMARY OF THE INVENTION

Even in a case in which a seatbelt is detached during execution of the one-pedal function and during traveling of the vehicle, and the vehicle stops in this state, stop hold of the vehicle is performed by the braking force of the one-pedal function. However, since the seatbelt is detached, the driver may get out of the vehicle. If the stop holding force weakens in a state in which the driver is absent, the vehicle may start moving. According to an aspect of the present invention, the safety during stop hold by the one-pedal function is improved.

In consideration of the above-described problem, a control device configured to control a vehicle is provided. The device comprises a traveling control unit capable of executing a one-pedal function of controlling both a driving force and a braking force of the vehicle in accordance with an operation amount of an accelerator pedal, and an output control unit of notifying a driver of an instruction to depress a brake pedal in a case in which a seatbelt is detached during execution of the one-pedal function and during traveling of the vehicle, and the vehicle stops in that state.

DESCRIPTION OF THE EMBODIMENTS

Figure 1:
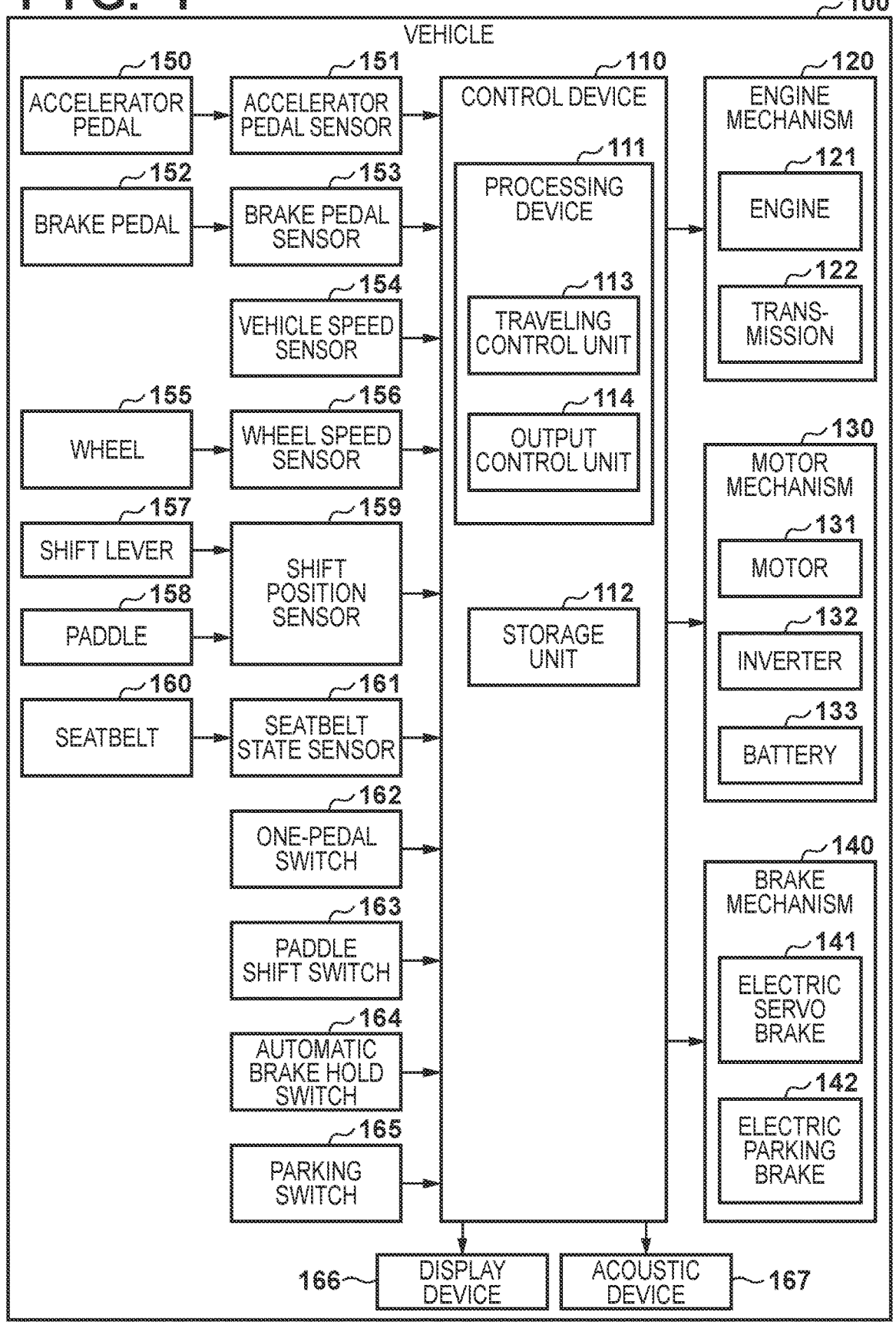
FIG. 1 is a block diagram for explaining an example of the arrangement of a vehicle according to an embodiment of the present invention.

Embodiments of the present invention will now be described with reference to the accompanying drawings. The same reference numerals denote similar elements throughout various embodiments, and a repetitive description will be omitted. In addition, the embodiments can appropriately be changed or combined.

An example of the arrangement of a vehicle 100 according to some embodiments of the present invention will be described with reference to FIG. 1. The vehicle 100 is a vehicle (so-called hybrid vehicle) using both a fossil fuel and electricity as a driving power source. The vehicle 100 may be a vehicle (so-called engine vehicle or diesel vehicle) using only a fossil fuel as the driving power source, or may be a vehicle (so-called electric vehicle) using only electricity as the driving power source or a vehicle (so-called fuel cell vehicle) using hydrogen as the driving power source.

The vehicle 100 includes constituent elements shown in FIG. 1. FIG. 1 mainly shows constituent elements used for the description of the embodiment, and other constituent elements (for example, a vehicle body, a suspension, and the like) of the vehicle 100 are not illustrated. A control device 110 controls the vehicle 100. The control device 110 may be formed as a general-purpose computer including a processing unit 111 and a storage unit 112. The processing unit 111 performs processing for controlling the vehicle 100. The processing unit 111 is formed by, for example, a processor. The storage unit 112 stores programs and data used in the processing by the processing unit 111. The storage unit 112 is formed by, for example, a volatile memory such as a RAM (Random Access Memory) and a nonvolatile memory such as a ROM (Read Only Memory).

The processing unit 111 includes, for example, a traveling control unit 113 and an output control unit 114. The traveling control unit 113 performs control concerning driving and braking of the vehicle 100. The output control unit 114 performs control concerning output of information to a driver. When the processing unit 111 executes a program stored in the storage unit 112, operations by the traveling control unit 113 and the output control unit 114 are performed. The control device 110 may be formed not by a general-purpose computer but by a dedicated integrated circuit (for example, ASIC). In this case, the traveling control unit 113 and the output control unit 114 may be formed by separate integrated circuits.

The control device 110 can also be called an ECU (Electronic Control Unit). The control device 110 may be formed by one ECU or may be formed by a plurality of ECUs. If the control device 110 is formed by a plurality of ECUs, these ECUs are arranged on various places in the vehicle and communicate with each other via an in-vehicle network such as a CAN (Controller Area Network).

An engine mechanism 120 gives a driving force to the vehicle 100 using a fossil fuel (for example, gasoline) as an energy source. The engine mechanism 120 includes an engine 121 and a transmission 122. The engine 121 is the driving source of the vehicle 100 and is controlled by the traveling control unit 113. The transmission 122 is, for example, a CVT (Continuously Variable Transmission). Alternatively, another transmission may be used. The traveling control unit 113 controls the engine mechanism 120, thereby making an engine brake actuate.

A motor mechanism 130 gives a driving force to the vehicle 100 using electricity as an energy source. The motor mechanism 130 includes a motor 131, an inverter 132, and a battery 133. The inverter 132 controls the output of the motor 131. The battery 133 accumulates electric energy and supplies the electric energy to the motor 131 via the inverter 132. The traveling control unit 113 controls the motor mechanism 130, thereby making a regeneration brake actuate.

The brake mechanism 140 gives a braking force to the vehicle 100. The brake mechanism 140 includes an electric servo brake 141 and an electric parking brake 142. The electric servo brake 141 is a brake that makes the regeneration brake by the motor cooperate with a friction brake by a liquid pressure, and gives a braking force according to the operation amount of a brake pedal 152 to the vehicle 100. The electric parking brake 142 gives a stop hold braking force independent of the operation amount of the brake pedal 152 to the rear wheels of the vehicle 100.

An accelerator pedal 150 is a pedal used to receive control of the driving force from the driver. An accelerator pedal sensor 151 detects the depression amount (to be also referred to as an AP operation amount hereinafter) of the accelerator pedal 150, and supplies it to the control device 110. The traveling control unit 113 controls the engine mechanism 120 and the motor mechanism 130 to give a driving force according to the AP operation amount to the vehicle 100.

The brake pedal 152 is a pedal used to receive control of the braking force from the driver. A brake pedal sensor 153 detects the depression amount (to be also referred to as a BP operation amount hereinafter) of the brake pedal 152, and supplies it to the control device 110. The traveling control unit 113 controls the electric servo brake 141 to give a braking force according to the BP operation amount to the vehicle 100.

A vehicle speed sensor 154 detects the vehicle speed of the vehicle 100, and supplies it to the control device 110. A wheel speed sensor 156 detects the rotation speed of a wheel 155, and supplies it to the control device 110. A shift position sensor 159 detects the position of a shift lever 157, and supplies it to the control device 110. In addition, the shift position sensor 159 detects an input using a paddle 158, and supplies it to the control device 110. Note that the paddle is provided, for example, on the periphery of a steering. The input using the paddle 158 includes a shift down instruction and a shift up instruction. A seatbelt state sensor 161 detects the attachment state of a seatbelt 160, and supplies it to the control device 110.

The traveling control unit 113 may be able to execute a one-pedal function. The one-pedal function is a function of controlling both the driving force and the braking force of the vehicle 100 in accordance with the AP operation amount. By the one-pedal function, the traveling control unit 113 may hold the stop state of the vehicle 100 after the stop without depending on the BP operation amount. For example, the traveling control unit 113 gives a braking force according to the AP operation amount to the vehicle 100 when the AP operation amount falls within the range of 0% to 30%, and gives a driving force according to the AP operation amount to the vehicle 100 when the AP operation amount falls within the range of 30% to 100%. The AP operation amount as the boundary between the braking force and the driving force can be set within the range of, for example, 20% to 40%. The traveling control unit 113 may change the value of the boundary in accordance with the vehicle speed.

The effect degree of the braking force according to the AP operation amount can be set from a plurality of levels via the shift lever 157 or the paddle 158. For example, the effect degree of the braking force can be set to each level from level 0 (the braking force is zero) to the upper limit level. The settable upper limit level can change depending on the remaining amount of the battery 133, the temperature of the battery 133, the temperature of the brake pad, the rotation speed of the engine 121, the rotation sped of the transmission 122, and the like. The maximum value of the upper limit level is, for example, level 6. The traveling control unit 113 may change the setting of the effect degree of the braking force not only in accordance with an instruction from the driver but also automatically without an instruction from the driver.

A one-pedal switch 162 is a switch used by the driver to perform switching between the enable state and the disable state of the one-pedal function. This switch may be formed by a physical button, or may be formed by a virtual button displayed on a touch panel. The one-pedal switch 162 is arranged on, for example, an instrument panel.

In a state in which the one-pedal function is disabled, the traveling control unit 113 may execute a paddle shift function. The paddle shift function is a function of changing, in accordance with an instruction from the driver via the shift lever 157 or the paddle 158, the effect degree of the braking force of the vehicle 100 in a case in which the AP operation amount is equal to or less than a traveling resistance. The effect degree of the braking force is changed by, for example, switching the change gear ratio of the transmission 122, adjusting the regeneration amount of the motor mechanism 130, adjusting the engine braking amount, or adjusting a pressure on the brake pad.

The effect degree of the braking force during the enable state of the paddle shift function can be set from a plurality of levels via the paddle 158. For example, the effect degree of the braking force can be set to each level from level 0 (the braking force is zero) to the upper limit level. The settable upper limit level can change depending on the charge state of the battery 133, and the like. The maximum value of the upper limit level is, for example, level 4. The traveling control unit 113 may change the setting of the effect degree of the braking force not only in accordance with an instruction from the driver but also automatically without an instruction from the driver.

A paddle shift switch 163 is a switch used by the driver to perform switching between the enable state and the disable state of the paddle shift function. This switch may be formed by a physical button, or may be formed by a virtual button displayed on a touch panel. The paddle shift switch 163 is arranged on, for example, the instrument panel.

The traveling control unit 113 may be able to execute an automatic brake hold function. The automatic brake hold function is a function of, in a case in which the vehicle 100 is stopped by depressing the brake pedal 152, holding the stop state of the vehicle 100 without depending on the BP operation amount after that (even if the foot is separated from the brake pedal 152). In the enable state of the automatic brake hold function, even if the driver separates the foot from the brake pedal 152 during the stop of the vehicle 100, the stop state of the vehicle 100 is held. The stop state is canceled when the driver depresses the accelerator pedal 150 to change the AP operation amount to a positive value.

An automatic brake hold switch 164 is a switch used by the driver to perform switching between the enable state and the disable state of the automatic brake hold function. This switch may be formed by a physical button, or may be formed by a virtual button displayed on a touch panel. The automatic brake hold switch 164 is arranged on, for example, the instrument panel.

A parking switch 165 is a switch used by the driver to instruct the start and end of actuation of the electric parking brake 142. This switch may be formed by a physical button, or may be formed by a virtual button displayed on a touch panel. The parking switch 165 is arranged on, for example, the instrument panel.

The traveling control unit 113 exclusively executes the automatic brake hold function and the one-pedal function. That is, both the automatic brake hold function and the one-pedal function are never enabled simultaneously. In addition, the traveling control unit 113 exclusively executes the paddle shift function and the one-pedal function. That is, both the paddle shift function and the one-pedal function are never enabled simultaneously.

A display device 166 is a device configured to present visual information to the driver. The display device 166 is formed by, for example, a liquid crystal display, an LED, a meter, or the like. An acoustic device 167 is a device configured to present auditory information to the driver. The acoustic device 167 is formed by, for example, a speaker. The display device 166 and the acoustic device 167 are arranged on, for example, the instrument panel. In this specification, notifications to the driver include a notification using only visual information, a notification using only auditory information, and a notification using both visual information and auditory information. For example, when notifying the driver of a message, the output control unit 114 may display the message as visual information on the display device 166, may reproduce the message as auditory information by the acoustic device 167, or may make both notifications.

Figure 2:
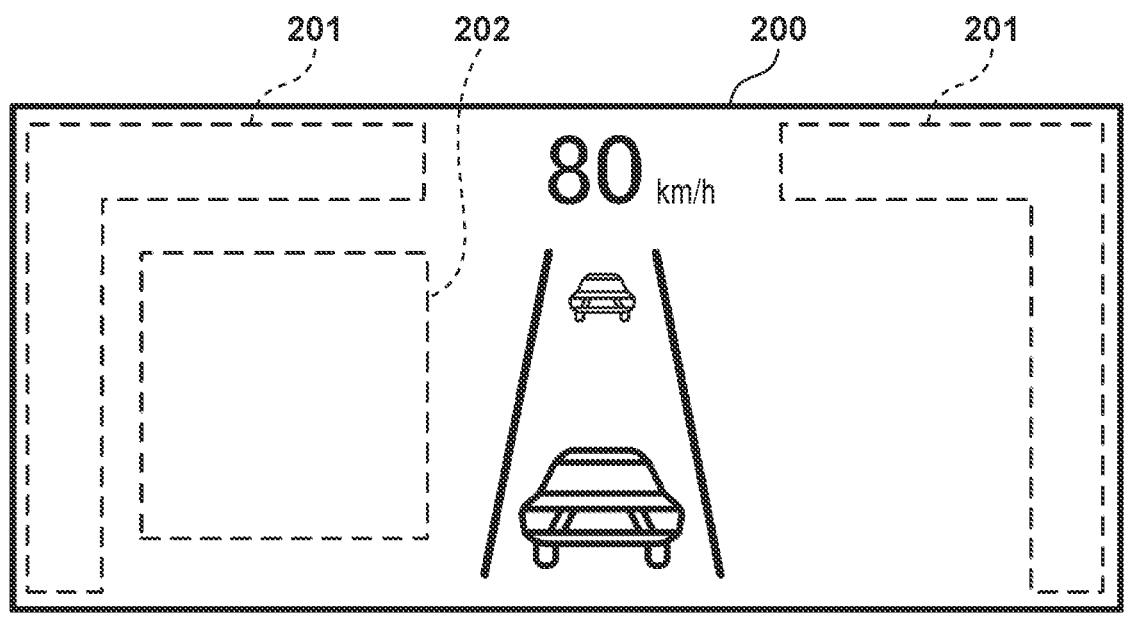
FIG. 2 is a schematic view for explaining an example of the arrangement of a screen according to the embodiment of the present invention.

An example of a screen 200 displayed on the display device 166 will be described with reference to FIG. 2. The screen 200 includes an indicator display region 201 and a message display region 202. Various indicators concerning the state of the vehicle are displayed in the indicator display region 201. A message to the driver is displayed in the message display region 202. In the example shown in FIG. 2, the indicator display regions 201 are arranged on both the left and right sides along the edge of the screen 200.

Examples of indicators that the output control unit 114 can display on the display device 166 will be described with reference to FIGS. 3A to 3E. Each of regions 301, 304, and 307 shown in FIGS. 3A to 3E is a region used to display one indicator, and occupies part of the indicator display region 201. The region 301 and the region 304 may be adjacent to each other. Here, "two regions are adjacent" means that a region used to display another indicator does not exist between the two regions.

Figure 3A:
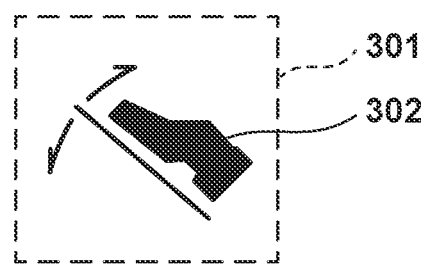
FIGS. 3A to 3E are views for explaining examples of display of indicators according to the embodiment of the present invention.

A one-pedal indicator 302 shown in FIG. 3A is an indicator representing that the one-pedal function is enabled. The one-pedal indicator 302 is arranged in the region 301.

The one-pedal indicator 302 is displayed when the one-pedal function is enabled, and is not displayed when the one-pedal function is disabled.

Figure 3B:
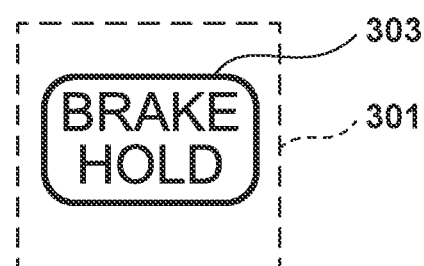

An automatic brake hold indicator 303 shown in FIG. 3B is an indicator representing that the automatic brake hold function is enabled. The automatic brake hold indicator 303 is arranged in the region 301. The automatic brake hold indicator 303 is displayed when the automatic brake hold function is enabled, and is not displayed when the automatic brake hold function is disabled.

Since the automatic brake hold function and the one-pedal function are exclusively executed, the output control unit 114 can exclusively display the one-pedal indicator 302 and the automatic brake hold indicator 303 in the same region 301 of the display device 166. By exclusively displaying the indicators in this way, the screen 200 can effectively be used.

Figure 3C:
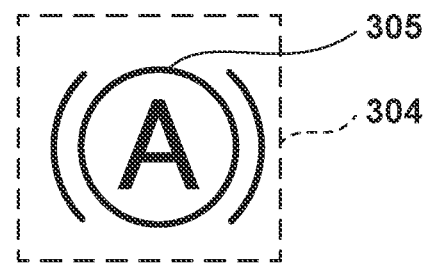

A stop hold indicator 305 shown in FIG. 3C is an indicator representing that the stop state of the vehicle 100 is held by the braking force of the one-pedal function. The stop hold indicator 305 is arranged in the region 304. The stop hold indicator 305 is displayed when stop hold is performed, and is not displayed when stop hold is not performed. However, the stop hold indicator 305 may not be displayed even if stop hold is performed.

Figure 3D:
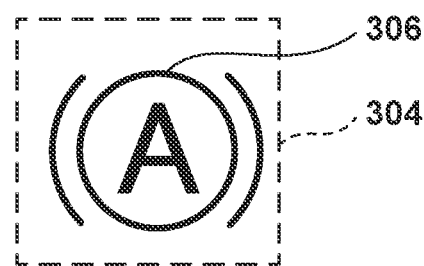

A stop hold indicator 306 shown in FIG. 3D is an indicator representing that the stop state of the vehicle 100 is held by the automatic brake hold function. The stop hold indicator 306 is arranged in the region 304. The stop hold indicator 306 is displayed when stop hold is performed, and is not displayed when stop hold is not performed.

Since the automatic brake hold function and the one-pedal function are exclusively executed, the output control unit 114 can exclusively display the stop hold indicator 305 and the stop hold indicator 306 in the same region 304 of the display device 166. By exclusively displaying the indicators in this way, the screen 200 can effectively be used. In addition, the stop hold indicator 305 and the stop hold indicator 306 are the same mark. Although the functions that cause the display of these indicators are different from each other, the indicators represent the same state in which stop hold of the vehicle 100 is performed. Hence, when the same mark is used, the driver can easily grasp the state of the vehicle 100.

Figure 3E:
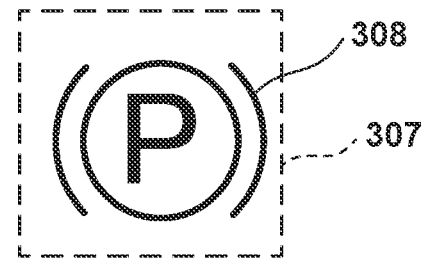

A parking indicator 308 shown in FIG. 3E is an indicator representing that the actuation of the electric parking brake 142 is completed. The parking indicator 308 is arranged in the region 307. The parking indicator 308 is displayed when the actuation of the electric parking brake 142 is completed, and is not displayed when the actuation of the electric parking brake 142 is not completed.

Figure 4:
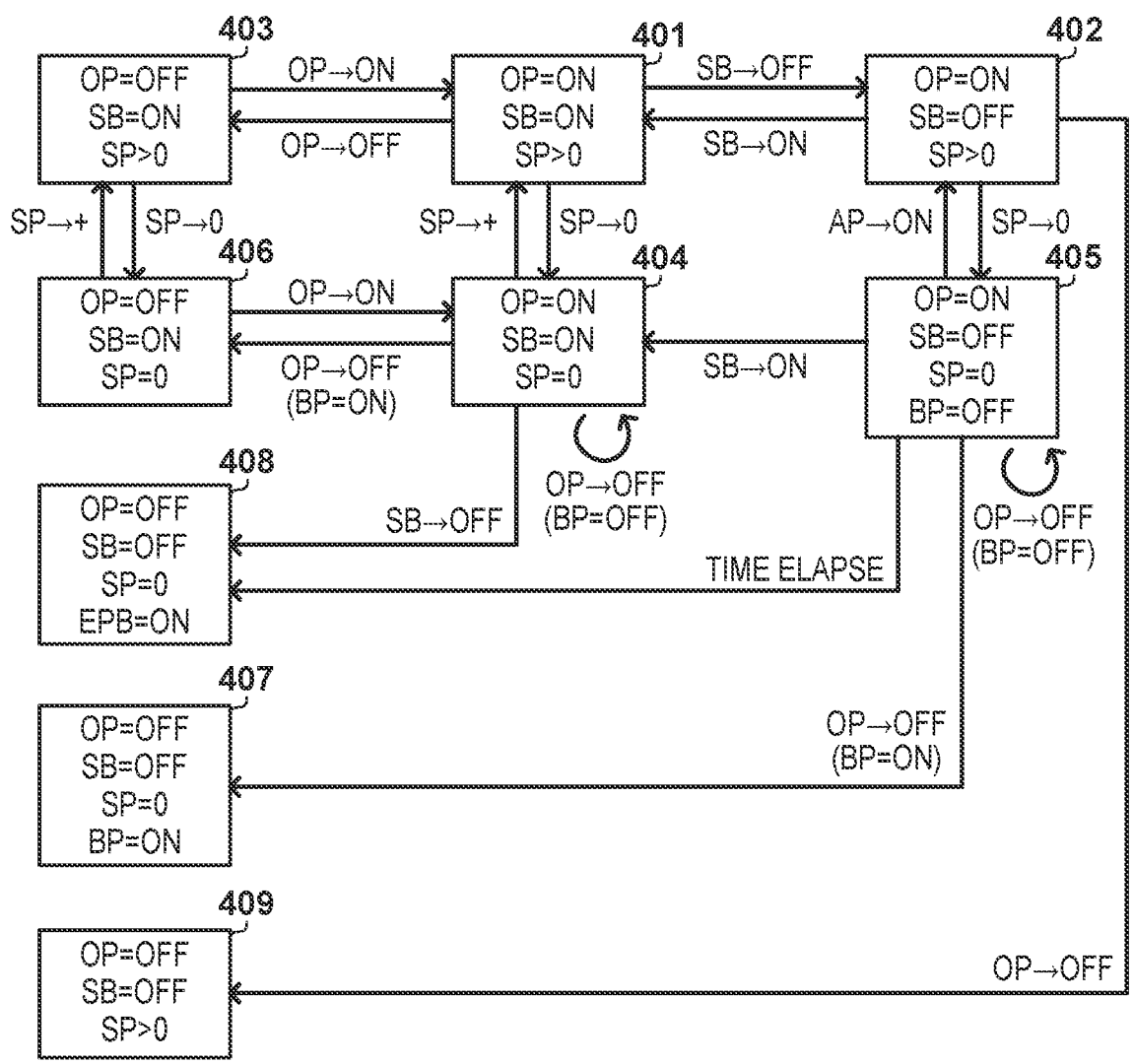
FIG. 4 is a state transition diagram for explaining the operation of a control device according to the embodiment of the present invention.

An example of control of the one-pedal function by the control device 110 will be described with reference to FIG. 4. In the states shown in FIG. 4, "OP" represents the state of the one-pedal function. "SB" represents the attachment state of the seatbelt 160. "AP" represents the operation state of the accelerator pedal 150. "BP" represents the operation state of the brake pedal 152. "EPB" represents the operation state of the electric parking brake 142. "SP" represents the vehicle speed. "ON" represents that the target is enabled, attached, or being operated, or completes actuation. "OFF" represents that the target is disabled, unattached, unoperated, or does not complete actuation. In the states shown in FIG. 4, "EPB=OFF" (the electric parking brake 142 does not complete the actuation) unless otherwise specified. In addition, the operation amounts of the accelerator pedal 150 and the brake pedal 152 are arbitrary values that can be taken, unless otherwise specified.

Each state will be described first. In a state 401, the one-pedal function is enabled, the seatbelt 160 is attached, and the vehicle speed is positive (that is, the vehicle 100 is traveling). In the state 401, the output control unit 114 displays the one-pedal indicator 302, and does not display the stop hold indicator 305.

In a state 402, the one-pedal function is enabled, the seatbelt 160 is detached, and the vehicle speed is positive. In the state 402, the output control unit 114 displays the one-pedal indicator 302, and does not display the stop hold indicator 305. Furthermore, the output control unit 114 notifies the driver of an instruction to attach the seatbelt 160. This notification is made by, for example, displaying a message in the message display region 202.

In a state 403, the one-pedal function is disabled, the seatbelt 160 is attached, and the vehicle speed is positive. In the state 403, the output control unit 114 does not display the one-pedal indicator 302 and the stop hold indicator 305.

In a state 404, the one-pedal function is enabled, the seatbelt 160 is attached, and the vehicle speed is zero (that is, the vehicle 100 is in the stop state). In this state, even if the BP operation amount is zero, the stop state of the vehicle 100 is held by the braking force of the one-pedal function. In the state 404, the output control unit 114 displays the one-pedal indicator 302 and the stop hold indicator 305.

In a state 405, the one-pedal function is enabled, the seatbelt 160 is detached, the vehicle speed is zero, and the BP operation amount is zero. In this state, even if the BP operation amount is zero, the stop state of the vehicle 100 is temporarily held by the braking force of the one-pedal function. In the state 405, the output control unit 114 displays the one-pedal indicator 302, and does not display the stop hold indicator 305. Since the seatbelt 160 is detached, the driver may get out of the vehicle 100. If the stop holding force weakens in a state in which the driver is absent, the vehicle may start moving. Hence, the output control unit 114 inhibits display of the stop hold indicator 305, thereby promoting the operation of the brake pedal 152 by the driver and suppressing the alighting of the driver before the completion of the actuation of the electric parking brake 142.

Furthermore, the output control unit 114 may notify the driver of an instruction to depress the brake pedal 152. This notification is made by, for example, displaying a message in the message display region 202. At the same time, the output control unit 114 may reproduce a warning sound from the acoustic device 167. By this notification, it is possible to suppress the alighting of the driver from the vehicle 100.

In a state 406, the one-pedal function is disabled, the seatbelt 160 is attached, and the vehicle speed is zero. In this state, the stop state of the vehicle 100 is held by the braking force obtained by operating the brake pedal 152. In the state 406, the output control unit 114 does not display the one-pedal indicator 302 and the stop hold indicator 305.

In a state 407, the one-pedal function is disabled, the seatbelt 160 is detached, the vehicle speed is zero, and the brake pedal 152 is depressed. In this state, the stop state of the vehicle 100 is held by the braking force obtained by operating the brake pedal 152. In the state 407, the output control unit 114 does not display the one-pedal indicator 302 and the stop hold indicator 305.

In a state 408, the one-pedal function is disabled, the seatbelt 160 is detached, the vehicle speed is zero, and the actuation of the electric parking brake 142 is completed. In this state, the stop state of the vehicle 100 is held by the stop hold braking force of the electric parking brake 142. In the state 408, the output control unit 114 displays the parking indicator 308, and does not display the one-pedal indicator 302 and the stop hold indicator 305.

In a state 409, the one-pedal function is disabled, the seatbelt 160 is detached, and the vehicle speed is positive. In the state 409, the output control unit 114 does not display the one-pedal indicator 302 and the stop hold indicator 305.

The state transition will be described next. In the state 401, if the seatbelt 160 is detached, the traveling control unit 113 transitions to the state 402. In this transition, the output control unit 114 keeps the one-pedal indicator 302 displayed. Furthermore, the output control unit 114 notifies the driver of an instruction to attach the seatbelt 160.

In the state 401, upon receiving an instruction to disable the one-pedal function, the traveling control unit 113 transitions to the state 403. In accordance with this transition, the output control unit 114 ends the display of the one-pedal indicator 302. The traveling control unit 113 may impart a predetermined condition to the transition. For example, the traveling control unit 113 may perform this transition upon receiving an instruction to disable the one-pedal function in a state in which the BP operation amount is positive, and may remain in the state 401 otherwise.

In the state 401, when the vehicle speed changes to zero, the traveling control unit 113 transitions to the state 404. In accordance with this transition, the output control unit 114 displays the stop hold indicator 305.

In the state 402, upon receiving an instruction to disable the one-pedal function from the driver, the traveling control unit 113 transitions to the state 409. In accordance with this transition, the output control unit 114 ends the display of the one-pedal indicator 302. The traveling control unit 113 may impart a predetermined condition to the transition. For example, the traveling control unit 113 may perform this transition upon receiving an instruction to disable the one-pedal function in a state in which the BP operation amount is positive, and may remain in the state 402 otherwise.

In the state 402, if the seatbelt 160 is attached, the traveling control unit 113 transitions to the state 401. In this transition, the output control unit 114 keeps the one-pedal indicator 302 displayed. Furthermore, the output control unit 114 ends the notification of the instruction to attach the seatbelt 160.

In the state 402, when the vehicle speed changes to zero, the traveling control unit 113 transitions to the state 405. In this transition, the output control unit 114 keeps the one-pedal indicator 302 displayed, and keeps the stop hold indicator 305 undisplayed. Furthermore, the output control unit 114 may notify the driver of an instruction to depress the brake pedal 152.

In the state 403, upon receiving an instruction to enable the one-pedal function from the driver, the traveling control unit 113 transitions to the state 401. In accordance with this transition, the output control unit 114 displays the one-pedal indicator 302. In the state 403, when the vehicle speed changes to zero, the traveling control unit 113 transitions to the state 406. In this transition, the display of the indicators is not changed.

In the state 404, upon receiving, from the driver, an instruction to disable the one-pedal function without depressing the brake pedal 152, the traveling control unit 113 remains in the state 404 to prevent a sudden start of the vehicle. In this case, the output control unit 114 may notify the driver that the brake pedal 152 needs to be depressed to disable the one-pedal function. In the state 404, upon receiving an instruction to disable the one-pedal function in a state in which the brake pedal is depressed, the traveling control unit 113 transitions to the state 406. Furthermore, the output control unit 114 may notify the driver that the one-pedal function is disabled.

In the state 404, if the seatbelt 160 is detached, the traveling control unit 113 starts transitioning to the state 408. In accordance with the start of this transition, the traveling control unit 113 starts actuating the electric parking brake 142 and transitions to the state 408 in accordance with the completion of the actuation. In this transition, the traveling control unit 113 disables the one-pedal function. In accordance with this, the output control unit 114 displays the parking indicator 308, and ends the display of the one-pedal indicator 302. Furthermore, the output control unit 114 may notify the driver that the one-pedal function is disabled. In accordance with the start of this transition, the output control unit 114 ends the display of the stop hold indicator 305. The reason why the indicator is not displayed is as described above concerning the state 405.

In the state 404, when the vehicle speed becomes positive, the traveling control unit 113 transitions to the state 401. In accordance with this transition, the output control unit 114 ends the display of the stop hold indicator 305. In the state 405, upon receiving, from the driver, an instruction to disable the one-pedal function without depressing the brake pedal 152, the traveling control unit 113 remains in the state 405 to prevent a sudden start of the vehicle. In this case, the output control unit 114 may notify the driver that the brake pedal 152 needs to be depressed to disable the one-pedal function. In the state 405, upon receiving an instruction to disable the one-pedal function in a state in which the brake pedal is depressed, the traveling control unit 113 transitions to the state 407. Furthermore, the output control unit 114 may notify the driver that the one-pedal function is disabled.

In the state 405, if the seatbelt 160 is attached, the traveling control unit 113 transitions to the state 404. In this transition, the output control unit 114 keeps the one-pedal indicator 302 displayed, and displays the stop hold indicator 305. Furthermore, the output control unit 114 ends the notification of the instruction to attach the seatbelt 160.

In the state 405, when the AP operation amount becomes positive, the traveling control unit 113 transitions to the state 402. In this transition, the traveling control unit 113 ends the display of the stop hold indicator 305.

In the state 405, the traveling control unit 113 starts actuating the electric parking brake 142 after the elapse of a predetermined time (for example, three sec) from the transition to the state 405, and according to the completion of the activation, transitions to the state 408. In this transition, the traveling control unit 113 disables the one-pedal function. In accordance with this, the output control unit 114 displays the parking indicator 308, ends the display of the one-pedal indicator 302, and keeps the stop hold indicator 305 undisplayed. Furthermore, the output control unit 114 may end the notification of the instruction to depress the brake pedal 152 and notify the driver that the one-pedal function is disabled. When the actuation of the electric parking brake 142 is started after waiting for the elapse of the predetermined time, spin of the vehicle 100 on, in particular, a low μ road can be suppressed. Furthermore, after the start of actuation of the electric parking brake 142, the traveling control unit 113 may increase the intensity of the electric parking brake 142 stepwise. This can further suppress the spin of the vehicle 100 particularly on a low μ road.

In the state 406, upon receiving an instruction to enable the one-pedal function from the driver, the traveling control unit 113 transitions to the state 404. In accordance with this transition, the output control unit 114 displays the one-pedal indicator 302 and the stop hold indicator 305. In the state 406, when the vehicle speed becomes positive, the traveling control unit 113 transitions to the state 403. In this transition, the display of the indicator is not changed.

Figure 5:
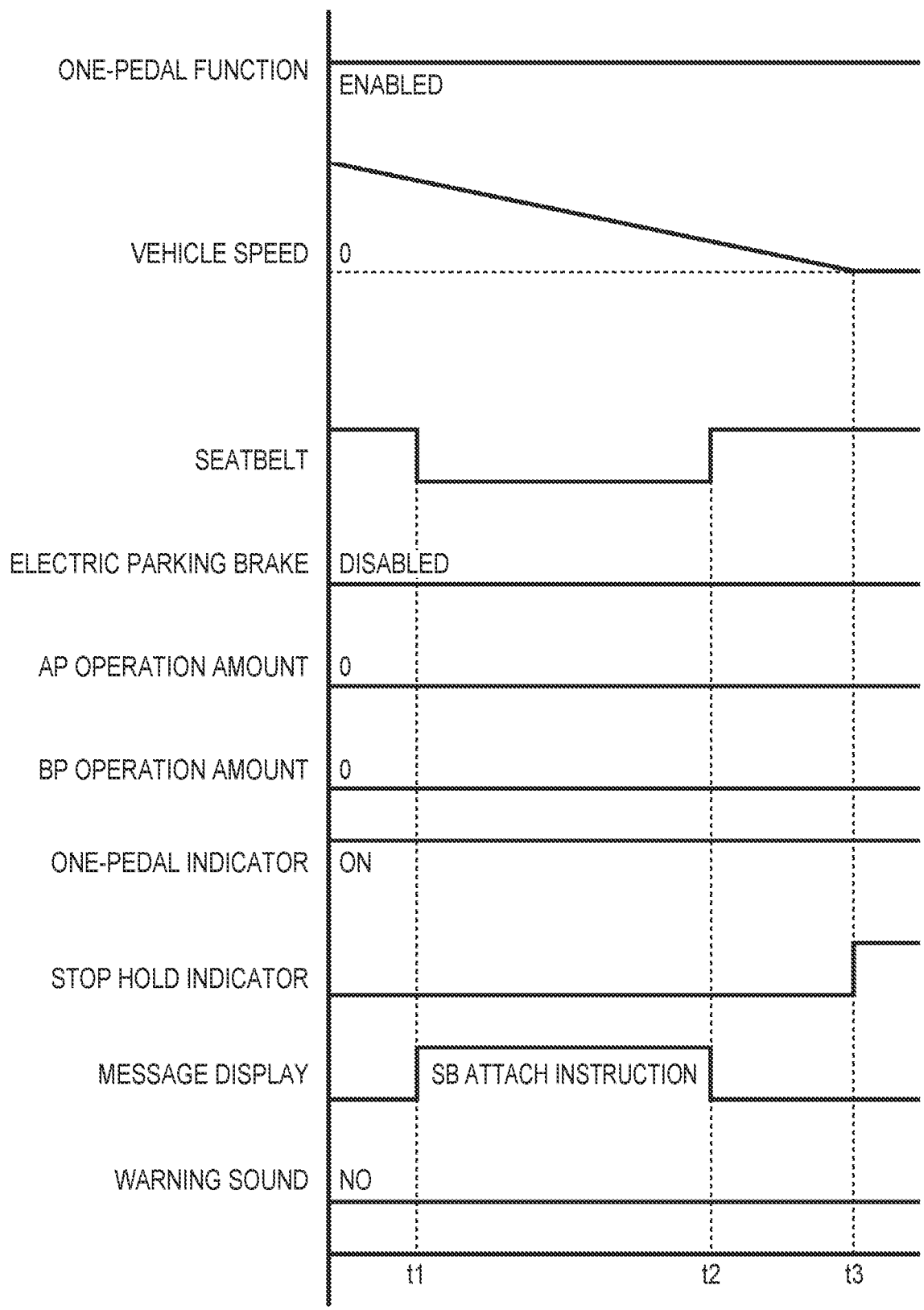
FIG. 5 is a timing chart for explaining the operation of the control device according to the embodiment of the present invention.
Figure 6:
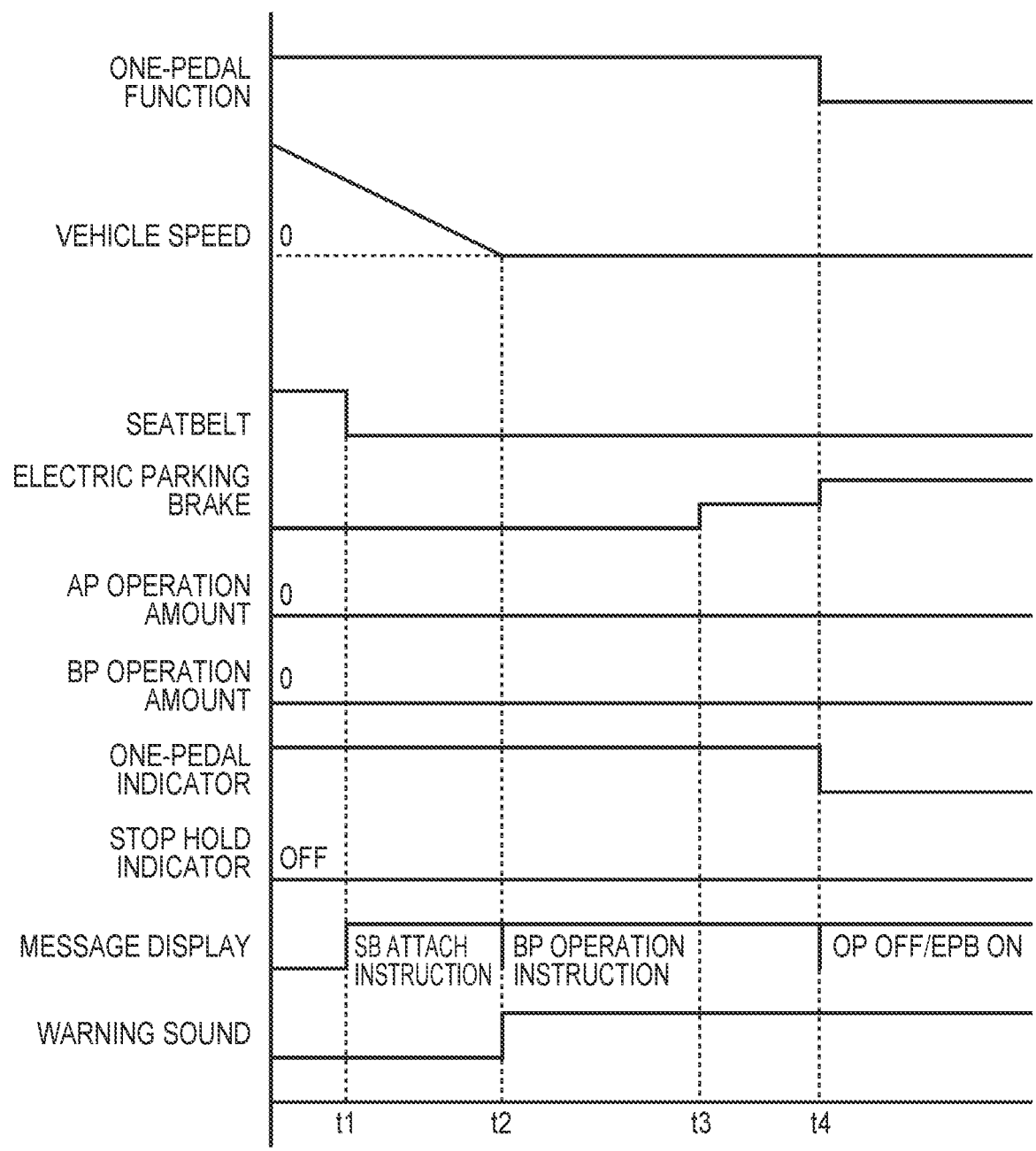
FIG. 6 is a timing chart for explaining the operation of the control device according to the embodiment of the present invention.
Figure 7:
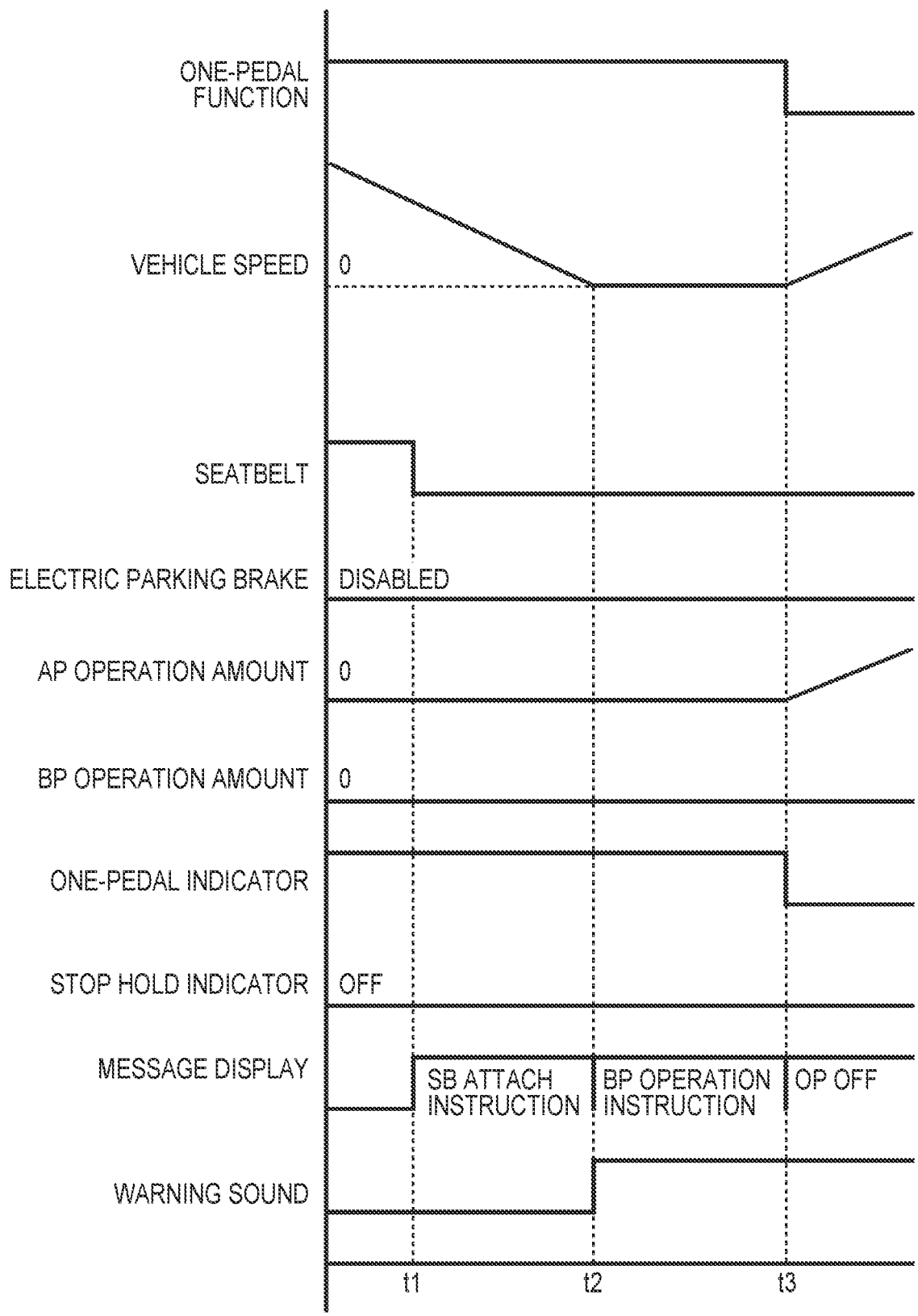
FIG. 7 is a timing chart for explaining the operation of the control device according to the embodiment of the present invention.

An example of processing by the control device 110 will be described with reference to FIGS. 5 to 7. In FIGS. 5 to 7, "one-pedal function" represents the state of the one-pedal function. At high level, the one-pedal function is enabled. At low level, the one-pedal function is disabled. "Vehicle speed" represents the speed of the vehicle 100. "Seatbelt" represents the attachment state of the seatbelt 160. At high level, the seatbelt 160 is attached. At low level, the seatbelt 160 is detached. "Electric parking brake" represents the stop holding force given by the electric parking brake 142. "AP operation amount" represents the operation amount of the accelerator pedal 150. "BP operation amount" represents the operation amount of the brake pedal 152. "One-pedal indicator" represents the state of the one-pedal indicator 302. At high level, the one-pedal indicator 302 is displayed. At low level, the one-pedal indicator 302 is not displayed. "Stop hold indicator" represents the state of the stop hold indicator 305. At high level, the stop hold indicator 305 is displayed. At low level, the stop hold indicator 305 is not displayed. "Message display" represents the message displayed in the message display region 202. At high level, the message is displayed. At low level, the message is not displayed. "Warning sound" represents the reproduction state of the warning sound. At high level, the warning sound is reproduced. At low level, the warning sound is not reproduced.

At the start point in the example of FIG. 5, the control device 110 is in the state 401. When the seatbelt 160 is detached at time t1, the control device 110 transitions to the state 402. In accordance with this transition, the output control unit 114 notifies the driver of an instruction to attach the seatbelt 160.

When the seatbelt 160 is attached at time t2, the control device 110 transitions to the state 401. In accordance with this transition, the output control unit 114 ends the notification of the instruction to attach the seatbelt 160.

When the vehicle speed changes to zero at time t3, the control device 110 transitions to the state 404. In accordance with this transition, the output control unit 114 displays the stop hold indicator 305.

At the start point in the example of FIG. 6, the control device 110 is in the state 401. The operation at time t1 is similar to the operation at time t1 in the example of FIG. 5. When the vehicle speed changes to zero at time t2, the control device 110 transitions to the state 405. In accordance with this transition, the output control unit 114 ends the notification of the instruction to attach the seatbelt 160, and notifies the driver of an instruction to depress the brake pedal 152.

At time t3 after the elapse of a predetermined time from time t2, the traveling control unit 113 starts actuating the electric parking brake 142. The traveling control unit 113 increases the intensity of the stop holding force of the actuation of the electric parking brake 142 stepwise, thereby suppressing the spin of the vehicle 100 particularly on a low μ road.

When the actuation of the electric parking brake 142 is completed at time t4, the traveling control unit 113 transitions to the state 408. In accordance with this transition, the traveling control unit 113 disables the one-pedal function. In addition, the output control unit 114 ends the display of the one-pedal indicator 302, and notifies the driver that the one-pedal function is disabled and that the actuation of the electric parking brake 142 is completed.

In the example of FIG. 7, the operation up to time t2 is similar to the operation up to time t2 in the example of FIG. 6. When the accelerator pedal 150 is depressed at time t3, the control device 110 transitions to the state 409. In accordance with this transition, the traveling control unit 113 disables the one-pedal function. In addition, the output control unit 114 ends the display of the one-pedal indicator 302, and notifies the driver that the one-pedal function is disabled.

Summary of Embodiment

[Arrangement 1]

There is provided a control device (110) configured to control a vehicle (100), comprising:

a traveling control unit (113) capable of executing a one-pedal function of controlling both a driving force and a braking force of the vehicle in accordance with an operation amount of an accelerator pedal (150); and an output control unit (114) of notifying a driver of an instruction to depress a brake pedal (152) in a case in which a seatbelt (160) is detached during execution of the one-pedal function and during traveling of the vehicle, and the vehicle stops in that state.

According to this arrangement, it is possible to suppress alighting of the driver from the vehicle during stop hold by the one-pedal function. Since this allows the driver to perform an operation of, for example, depressing the brake pedal even if the one-pedal stop hold control fails, and the vehicle starts moving, the safety improves.

[Arrangement 2]

There is provided the control device according to arrangement 1, wherein in the case in which the seatbelt is detached during execution of the one-pedal function and during traveling of the vehicle, and the vehicle stops in that state, the traveling control unit starts actuating an electric parking brake (142) after an elapse of a predetermined time from the stop.

According to this arrangement, it is possible to suppress the spin of the vehicle particularly on a low μ road.

[Arrangement 3]

There is provided the control device according to arrangement 2, wherein after the start of the actuation of the electric parking brake after the elapse of the predetermined time, the traveling control unit increases an intensity of the electric parking brake stepwise.

According to this arrangement, it is possible to further suppress the spin of the vehicle particularly on a low μ road.

[Arrangement 4]

There is provided the control device according to arrangement 2 or 3, wherein in a case in which the actuation of the electric parking brake started after the elapse of the predetermined time is completed, the output control unit displays, on a display device (166) of the vehicle, a first indicator (308) indicating that the actuation of the electric parking brake is completed, and ends the notification of the instruction to depress the brake pedal.

According to this arrangement, the driver can easily grasp switching to hold by the electric parking brake 142.

[Arrangement 5]

There is provided the control device according to any one of arrangements 1 to 4, wherein the output control unit can further display, on a display device of the vehicle, a second indicator (305) indicating that a stop state of the vehicle is held by a braking force of the one-pedal function, and in the case in which the seatbelt is detached during execution of the one-pedal function and during traveling of the vehicle, and the vehicle stops in that state, the output control unit does not display the second indicator on the display device.

According to this arrangement, it is possible to suppress alighting of the driver from the vehicle and improve the safety.

[Arrangement 6]

There is provided a method of controlling a vehicle (100), wherein the vehicle includes:

traveling control unit (113) capable of executing a one-pedal function of controlling both a driving force and a braking force of the vehicle in accordance with an operation amount of an accelerator pedal (150), and the method comprises:

notifying a driver of an instruction to depress a brake pedal (152) in a case in which a seatbelt (160) is detached during execution of the one-pedal function and during traveling of the vehicle, and the vehicle stops in that state.

According to this arrangement, the safety during stop hold by the one-pedal function improves.

[Arrangement 7]

There is provided a non-transitory computer-readable storage medium storing a program configured to cause a computer to function as each unit of a control device of any one of arrangements 1 to 5.

According to this arrangement, the present invention can be provided in a form of a storage medium.

What is claimed is:

1. A control device configured to control a vehicle, the device comprising:
   at least one processor circuit with a memory comprising instructions, that when executed by the processor circuit, cause the at least one processor circuit to at least:
   execute a one-pedal function of controlling both a driving force and a braking force of the vehicle in accordance with an operation amount of an accelerator pedal; and
   notify a driver of an instruction to depress a brake pedal in response to a case in which a seatbelt changes from an attached state to a detached state during execution of the one-pedal function and during traveling of the vehicle, and the vehicle stops in the detached state of the seatbelt.

2. The device according to claim 1, wherein in the case in which the seatbelt changes from the attached state to the detached state during execution of the one-pedal function and during traveling of the vehicle, and the vehicle stops in the detached state of the seatbelt, the instructions further cause the at least one processor circuit to start actuating an electric parking brake after an elapse of a predetermined time from the stop.

3. The device according to claim 2, wherein after the start of the actuation of the electric parking brake after the elapse of the predetermined time, the instructions further cause the at least one processor circuit to increase an intensity of the electric parking brake stepwise.

4. The device according to claim 2, wherein in a case in which the actuation of the electric parking brake started after the elapse of the predetermined time is completed, the instructions further cause the at least one processor circuit to display, on a display device of the vehicle, a first indicator indicating that the actuation of the electric parking brake is completed, and ends the notification of the instruction to depress the brake pedal.

5. The device according to claim 1, wherein the instructions further cause the at least one processor circuit to display, on a display device of the vehicle, a second indicator indicating that a stop state of the vehicle is held by a braking force of the one-pedal function, and
  in the case in which the seatbelt changes from the attached state to the detached state during execution of the one-pedal function and during traveling of the vehicle, and the vehicle stops in the detached state of the seatbelt, the instructions further cause the at least one processor circuit not to display the second indicator on the display device.

6. A method of controlling a vehicle, the method comprising:
  executing a one-pedal function of controlling both a driving force and a braking force of the vehicle in accordance with an operation amount of an accelerator pedal; and
  notifying a driver of an instruction to depress a brake pedal in response to a case in which a seatbelt changes from an attached state to a detached state during execution of the one-pedal function and during traveling of the vehicle, and the vehicle stops in the detached state of the seatbelt.

7. A non-transitory computer-readable storage medium storing a program comprising instructions, that when executed by at least one processor circuit, cause the at least one processor circuit to at least:
  execute a one-pedal function of controlling both a driving force and a braking force of the vehicle in accordance with an operation amount of an accelerator pedal; and
  notify a driver of an instruction to depress a brake pedal in response to a case in which a seatbelt changes from an attached state to a detached state during execution of the one-pedal function and during traveling of the vehicle, and the vehicle stops in the detached state of the seatbelt.

* * * * *